Oct. 28, 1941.                K. R. H. SCHWENN                2,260,541
                    SETTABLE COUNTER FOR INDICATING INSTRUMENTS
                    Filed Oct. 7, 1938              2 Sheets-Sheet 1

INVENTOR.
Kurt R. H. Schwenn
BY Stephen Cerstvik
ATTORNEY.

Oct. 28, 1941.  K. R. H. SCHWENN  2,260,541
SETTABLE COUNTER FOR INDICATING INSTRUMENTS
Filed Oct. 7, 1938  2 Sheets-Sheet 2
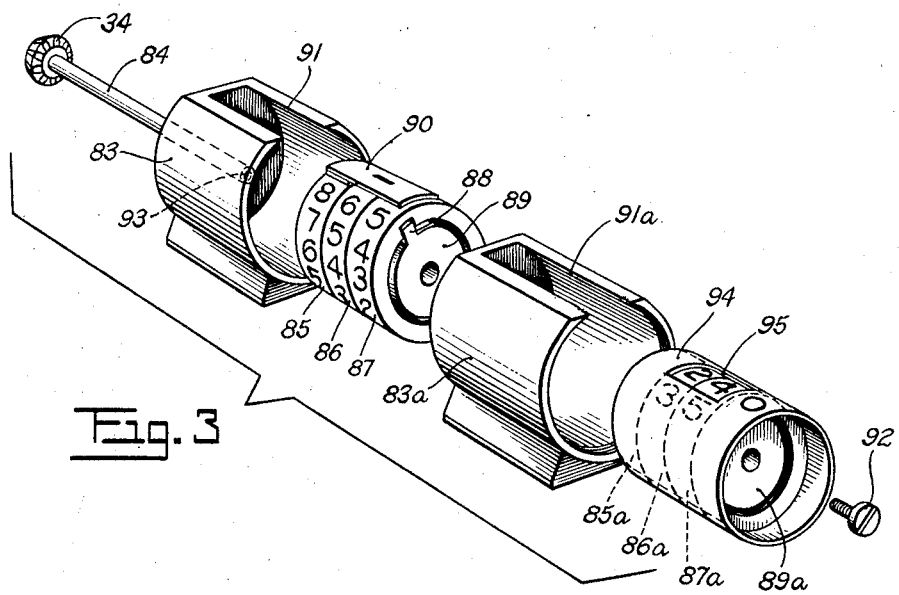
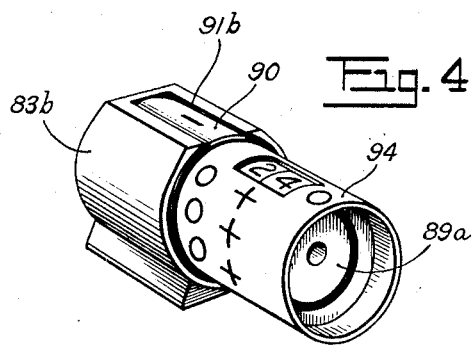
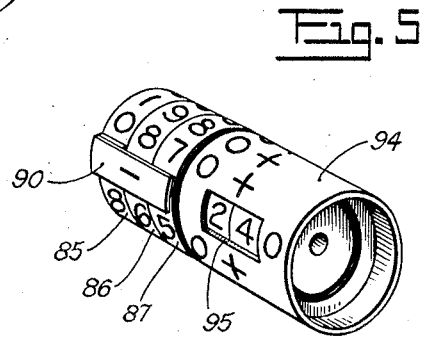
INVENTOR.
*Kurt R.H. Schwenn*
BY *Stephen Cerstvik*
ATTORNEY.

Patented Oct. 28, 1941

2,260,541

UNITED STATES PATENT OFFICE 2,260,541

SETTABLE COUNTER FOR INDICATING INSTRUMENTS

Kurt R. H. Schwenn, New York, N. Y., assignor to Bendix Aviation Corporation, South Bend, Ind., a corporation of Delaware Application October 7, 1938, Serial No. 233,885

5 Claims. (Cl. 73—4)

The present invention relates to indicating instruments and more particularly to means for setting the instrument and means for indicating in which direction the instrument has been set and the magnitude of said setting.

In indicating instruments of the pressure actuated type such, for example, as sensitive altimeters, it is desirable to set the altimeter on an aircraft at one airport or during flight so that the altimeter will indicate zero when the craft lands at another airport the elevation of which is known. While the absolute elevation does not vary, the elevation as indicated by pressure changes in the atmosphere does vary. It becomes necessary, therefore, to utilize setting means for the instrument, and means for indicating that the instrument has been set, and it is also necessary that the magnitude and the direction of the setting be indicated.

For example, if the airport to which the plane is headed is located at sea level and the atmospheric pressure increases, the elevation, as represented in pressure terms, would be below sea level. It is necessary, therefore, under such conditions that the setting imparted to the altimeter be a negative one and the algebraic sign of that setting must be indicated by the means indicating the amount of the setting. In this manner, not only does it become possible to set the altimeter so that when the craft lands, the altimeter indication will be zero, but during flight the pilot also has a definite indication of whether he should add or subtract the magnitude of the setting from the altimeter indication.

One of the objects of the present invention, therefore, is to provide a novel combination of a settable indicating instrument, and means for indicating algebraically the setting of said instrument.

Another object is to provide in a settable indicating instrument, means indicating the magnitude and direction of the setting of the instrument.

A further object is to provide in an indicating instrument, means whereby the instrument may be set for a predetermined condition and to indicate such condition upon its being reached, and novel means to indicate the predetermined condition at the time the instrument is set.

A still further object is to provide novel counter or indicating means wherein the alegbraic magnitude of a quantity may be indicated.

The above and further objects and advantages of the invention will appear more fully hereinafter from a consideration of the detailed description which follows, taken together with the accompanying drawings wherein two embodiments of the invention are illustrated. It is to be expressly understood, however, that the drawings are for the purpose of illustration and description only, and are not designed as a definition of the limits of the invention, reference being had for this purpose to the appended claims.

In the drawings wherein like reference characters refer to like parts throughout the several views;

Fig. 3 is an exploded view, in perspective, of one embodiment of the novel counter or indicating means;

Fig. 4 is a view in perspective of another embodiment of the novel counter or indicating means; and Fig. 5 is a view, in perspective, of the internal structure of the device of Fig. 4.

Figure 1:
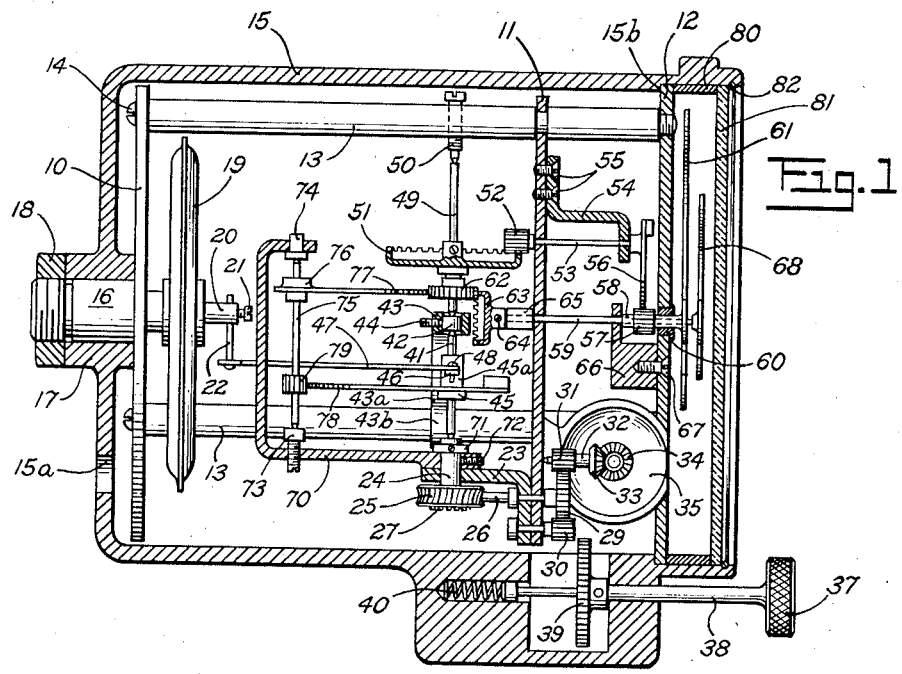
Fig. 1 is a side elevation, in section, illustrating an embodiment of the invention as applied, for example, to a sensitive altimeter.

In the drawings, the present invention is illustrated as applied to a sensitive altimeter although it is to be expressly understood that the invention is not to be so limited, but may be utilized in connection with any indicating instrument.

Referring to the drawings and more particularly to Fig. 1, the operating mechanism of the novel combination is shown mounted in a frame of any suitable type which in the present embodiment comprises a rear frame member or plate 10, a front frame member or plate 11, and a plate 12 forming a dial member, said plates and dial being held in spaced relation by spacers 13 and screws 14.

Mounted in casing 15 by means of plate 10 carrying a stud shaft 16 extending into hollow hub 17 in said casing 15 and locked in place by nut 18 is an expansible diaphragm assembly 19 which for the sake of simplicity is illustrated as a single aneroid capsule. Mounted on center post 20 of said diaphragm and adjustably connected thereto by screw 21 is a rod 22 which transmits the motion of the expansible diaphragm to the operating mechanism which will be set out in more detail hereinafter.

Casing 15 is provided with an opening 15a whereby the pressure of the atmosphere is introduced to the exterior of diaphragm 19.

The novel means of the present invention comprise an L-shaped bracket 23 fastened to front plate 11 on one leg of which bracket is journaled the shaft 24 of worm gear 25, while on the other leg is journaled one end of a shaft 26 carrying the worm 27 meshing with the worm gear 25 and located beneath said gear as seen in Fig. 1, the other end of shaft 26 passing through said leg of bracket 23 and carrying integrally therewith the gear 29 meshing with pinion 30 and small gear 31. Gear 31 is mounted integrally with shaft 32 journaled in plate 11 and carries at one end thereof bevel pinion 33 meshing with bevel gear 34 to drive the novel counter or indicating means 35.

Counter 35 is illustrated as comprising a plurality of interconnected drum dials or numbering wheels having markings thereon which are visible from the front of the instrument through an opening 36 in dial plate 12. The drums of said counter are interconnected with each other and with novel shielding means in a manner that will be described in detail later. A knob 37 secured to or formed integrally with shaft 38 carrying gear 39 for meshing with pinion 30 is held in inoperative position by spring 40.

Rockshaft 41 is journaled at one end in shaft 24 and at the other end in bearing 42 held in a block 43 by screw 44. Block 43 is adjustably mounted on one of the spacers 13 by extension 43a thereof and collar 43b fastened to said spacer by means (not shown). Mounted on rockshaft 41 for rotation therewith is collar 45 whose extension 45a carries arm 46 to which is connected at one end thereof the link 47 by means of a pin 48, the other end of said link being pivotably connected to rod 22 whereby the movement of the expansible diaphragm 19 is transmitted to rockshaft 41.

Shaft 49 is aligned with shaft 41 and is mounted in bearings 42 and 50. Mounted on said shaft 49 for rotation therewith is the crown gear 51 meshing with pinion 52 integral with shaft 53 journaled near one end in plate 11 and adjacent to the other end in Z-bar 54 held in position on plate 11 by means of screws 55. Carried at the end of shaft 53 is gear sector 56 meshing with pinion 57 integral with hollow shaft 58 rotatably mounted on shaft 59. The outer end of shaft 58 passes through bearing 60 and carries at its end the elongated pointer or sweep-hand 61.

Also mounted on shaft 49 for rotation therewith is the gear 62 meshing with the small crown gear 63 connected to shaft 59 by means of screw 64 and spaced from plate 11 by means of collar 65. Shaft 59 is journaled in plate 11 and in L-bar 66 fastened to the dial plate 12 by means of screw 67. Said shaft 59 passes through the hollow shaft 58 and carries at its extremity the small pointer 68 cooperating with sweep-hand 61 to rotate therewith over dial 69 marked upon dial plate 12.

A planetary system cooperating with the novel counter or indicating means is provided for presetting both the pointers 61 and 68. Said means comprise an angle arm 70 carried by shaft 24 and mounted on said shaft between the collar 71 and the bracket 23, said arm being fastened to shaft 24 by means of screws 72 whereby the angle arm may be rotated integrally with the shaft 24. In opposite legs of the angle arm 70 are mounted the adjustable bearings 73 and 74 in which is journaled the counter-shaft 75.

A sector 78 mounted in abutting relation with collar 45 for rotation therewith meshes with pinion 79 integral with counter-shaft 75 to rotate said counter-shaft upon rotation of collar 45.

Mounted on counter-shaft 75 for rotation therewith is the collar 76 on which is mounted sector 77 meshing with gear 62 to rotate the same upon rotation of counter-shaft 75.

Plates 10 and 11 carrying the instrument mechanism are slipped into place into casing 15, with the dial plate 12 abutting casing 15 at shoulder 15b and being held in place against said shoulder by spacer ring 80 located behind cover glass 81 which is held in place by resilient ring 82.

The operation of the main device is as follows:

As the craft carrying the device of the present invention rises from the ground, the pressure within casing 15 is reduced and the diaphragm assembly 19 expands thereby rotating rockshaft 41 clockwise as viewed from the bottom of the instrument in Fig. 1. This rotation of rockshaft 41 clockwise rotates sector 78 in the same direction to thereby rotate gear 79, counter-shaft 75, collar 76 and sector 77 in counter-clockwise direction. Sector 77 rotates gear 62, shaft 49 and crown gear 51 clockwise. Clockwise rotation of crown gear 51 rotates gear 52, shaft 53 and sector 56 to rotate gear 57, hollow shaft 58 and sweep-hand 61 in a clockwise direction as viewed from the face of the instrument whereby the member 61 is moved clockwise over the dial plate 12 to indicate the elevation in hundreds of feet.

Clockwise rotation of gear 62 meshing with crown gear 63 thereby rotates said crown gear, shaft 59 and pointer 68 in a clockwise direction over the dial plate 12 so that said pointer 68 moves over the dial 69 inscribed on dial plate 12 to thereby indicate the elevation in thousands of feet. The combined indication of pointers 68 and 61 can be utilized to give the altitude indication in any desired units and tenths of said unit when the particular gear ratio shown is utilized.

When it is desired to preset the instrument to the pressure altitude of a landing field toward which the craft is headed, knob 37 is pushed inwardly or to the left as viewed in Fig. 1, against the resilient pressure of spring 40, whereby gear 39 meshes with pinion 30. Upon rotation of knob 37, gear 39 rotates pinion 30 to thereby rotate gear 29 and pinion 31.

Rotation of gear 29, produces rotation of worm 27 to thereby drive worm wheel 25, shaft 24 and angle arm 70 to move the counter-shaft 75 about the sector 78. Upon movement of counter-shaft 75, pinion 79 rotates over the teeth of sector 78 to rotate counter-shaft 75 whereby sector 77 is operated to rotate gear 62. Rotation of gear 62 drives the crown gear 63, shaft 59 and pointer 68 so that said pointer can be set as desired.

Rotation of gear 62 simultaneously rotates shaft 49, crown gear 51 and pinion 52 to oscillate sector 56 whereby pinion 57, hollow shaft 58 and sweep-hand 61 are moved so that sweep-hand 61 is set simultaneously with the hand 68.

Simultaneously with the actuation of gear 29 and pinion 31, the bevel pinion 33 is rotated to in turn rotate bevel gear 34 to rotate the cylinders of the novel counter 35 to set the same so that they will indicate in magnitude and direction the setting of hands 61 and 68.

The construction of the novel counter or indicating means of the present invention may be best comprehended by reference to Figs. 3–5.

Referring to Fig. 3 a counter generically designated as 35 is shown as comprising a casing 83 in which is mounted the shaft 84 driven by bevel gear 34. The shaft 84 passes completely through the casing 83 and enters the casing 83a. Mounted for rotation over shaft 84 and located in the casing 83 are the three drums or numbering wheels 85, 86 and 87 of the counter mechanism, the drum 87 being driven by the tongue 88 on the disc 89 fastened to shaft 84 in any desired manner for rotation therewith. Rotation of disc 89 rotates the drums of the counter in a manner well known in the art. The drums are so mounted that upon rotation in a counter-clockwise direction, as viewed in Fig. 3, a gradually increasing total is presented by the numerals of drums 85, 86 and 87. The bevel gear 34 is so rotated by gear 39 and the intermediate gearing as to present an increasing indication on the drums as the pointer 61 and 68 are rotated counter-clockwise to the desired setting.

Mounted on drum 85 and fastened thereto for rotation therewith is the shield 90 carrying an algebraic designation thereon in the form of a minus sign (—). The shield is concealed from view except when it is aligned with the opening 91.

Also mounted for rotation on shaft 84 and located in the casing 83a are the drums or numbering wheels 85a, 86a, and 87a. A disc 89a is drivably connected to the drum 87a by means of a tongue (not shown) similar to tongue 88. Disc 89a is fastened to the shaft 84 by means of a screw 92 fastened in the opening 93 so that said disc 89a is rotated simultaneously with shaft 84. Rotation of disc 89a and the tongue integral therewith drives the drum 87a and subsequently drums 86a and 85a in the same manner as drums 87, 86 and 85 respectively are driven with the exception that counter-clockwise rotation of the drums 87a, 86a and 85a produces a decreasing total as presented by the numerals on said drums in direct contradistinction to rotation in the same direction of drums 87, 86 and 85 the numerals of which present an increasing total as stated above. Mounted on drum 85a for rotation therewith is a cylindrical shield 94 provided with an opening 95 therein. The surface of the shield 94 carries the designations as shown in Figs. 3, 4 and 5 comprising a series of algebraic designations representing by a plurality of plus signs (+) extending circumferentially about the periphery of the shield on both sides of the opening 95 and a series of zeros (0) extending about the periphery adjacent the left hand edge of the shield. A single zero (0) is also located to the right of the opening 95, the zero (0) being omitted on the left side of the opening for purposes to be set out later.

Figure 2:
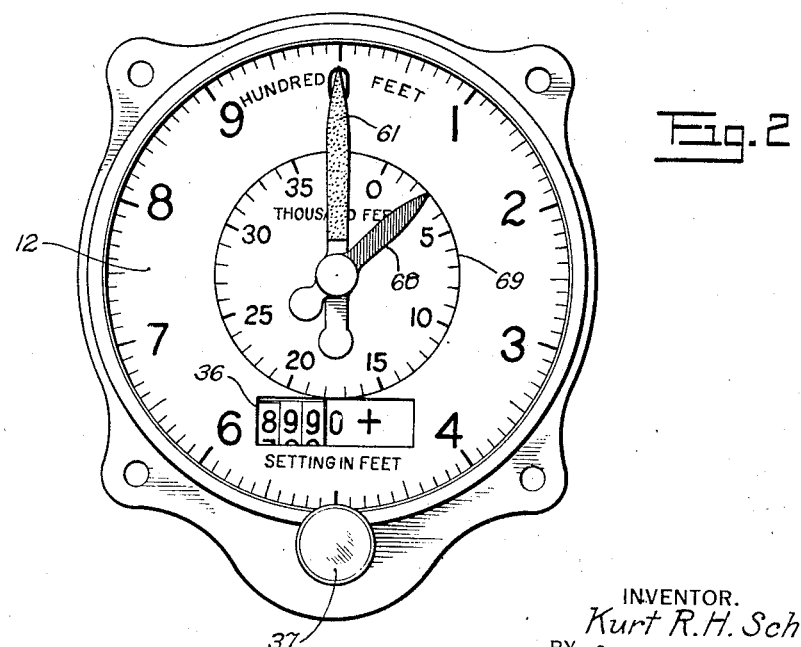
Fig. 2 is a front view of the device shown in Fig. 1.

The operation of the novel counter means is as follows:

Assuming that a series of three zeros appears in the opening 91 of casing 83. At this time shield 90 is hidden from view and is located just below the left hand edge of opening 91. The shield 94 has been so rotated that the opening 95 is concealed from view, said opening being located just below the left hand edge of opening 91a in the casing 83a. One of the zeros extending about the periphery of shield 94 is aligned with the zeros of the counters 85, 86 and 87 so that a total sum comprising four zeros in a row is presented to view. At the same time one of the plus (+) designations appears in the opening 91a in line with the four zeros. Upon counterclockwise rotation of shaft 84, the successive members of the counters 87, 86 and 85 appear in the opening 91. For each movement of drum 85, whereby a different number thereon appears in the opening 91, the shield 90 and cylindrical shield 94 are rotated one tenth of a complete revolution. Upon rotation of cylindrical shield 94 a series of zeros and plus signs (+) appear successively in the opening 91a. In the particular embodiment shown, a total of 8990 units can be exhibited in opening 91 so that for any pressure elevations up to 8990 feet above sea level, for example, existing at the airport to which the craft is headed, the pointers 61 and 68 can be set and the counter 35 will indicate the settings not only in magnitude but also in direction as the plus sign (+) appears in the opening 91a and can be seen through the opening 36 of dial plate 12 as seen in Fig. 2. Other units of altitude or any indication above or below a desired datum can be represented by the drums or numbering wheels and the particular numerical range of the drums may be chosen as desired.

If we assume, however, that the particular pressure altitude of the airport to which the craft is heading is below sea level, as for example when the atmospheric pressure rises and the absolute altitude of the airport is that of sea level, the drums 85, 86 and 87 are rotated clockwise instead of counter-clockwise from the indication of three zeros presented by these drums. These drums are so interconnected, in a manner well known, that upon rotation of drum 87 clockwise from zero, when the drums 86 and 85 also indicate zero, the drums 87, 86 and 85 are simultaneously rotated to attempt to indicate the next numeral appearing on the drums. Upon such clockwise rotation, however, the drums 87, 86 and 85 being rotated simultaneously, the shield 90 carrying the negative (—) designation appears in the opening 91 and covers the indication of the drums 86 and 87. Further rotation of drum 87, however, in the same direction, would not rotate drum 85 immediately and it would require a complete rotation of drum 87 to rotate drum 86 one tenth of a revolution and ten such complete revolutions of drum 87 would be required before drum 86 is rotated one complete revolution to thereby attempt to turn drum 85 by one tenth of a revolution. The range and interconnection of the drums is so chosen that only nine tenths of a revolution of drum 86 is permitted in the clockwise direction so that the shield 90 cannot be rotated out of alignment of opening 91 in a clockwise direction but the drums must all be rotated counter-clockwise back to zero before the shield 90 can be moved counter-clockwise out of the opening 91.

Upon the simultaneous rotation of drums 85, 86 and 87, the drums 85a, 86a and 87a are likewise simultaneously rotated in clockwise direction so that opening 95 in shield 94 becomes aligned with the opening 91a, the drum 86a presenting the numeral 0 and the drum 87a presenting the numeral 1 so that with the minus sign (—) on shield 90 appearing on opening 91 the reading of the counter is minus 010 since the single zero to the right of opening 95 on the shield 94 is read when the minus sign (—) appears in opening 91. As shown, the counters 87a and 86a can be rotated until a minus (—) indication of 990 feet is presented. At this limit, drum 85 can no longer be rotated clockwise so that the drum 85a also cannot be rotated clockwise and opening 95 in shield 94 cannot be removed from alignment with opening 91a by rotation in a clockwise direction. Other units of altitude and the range of the negative (—) drums of the counter can be chosen as desired.

In the embodiment as illustrated in Figs. 4 and 5, the two groups of drums 85, 86 and 87, and 85a, 86a, and 87a and the shielding mechanism therefor are all illustrated as being mounted in a single casing 83b, said casing being shown as cut away in order to better illustrate the indications on shield 94. The operation of the device as illustrated in Fig. 4 is the same as that of the device of the Fig. 3.

In Fig. 5 is illustrated the drum and shield mechanisms of the device as illustrated in Fig. 4, the entire mechanism being shown as rotated bodily counter-clockwise so that the designations on shield 94 above opening 95 are illustrated more clearly.

Novel means are thus provided whereby an indicating mechanism can be set to a desired value, and a counter of indicating means are also provided to indicate the amount and direction of said setting.

Although the two embodiments of the invention have been illustrated and described, further changes and modifications in form, materials, and relative arrangement of parts, which will now appear to those skilled in the art, may be made without departing from the scope of the invention. Reference is therefore to be had to the appended claims for a definition of the limits of the invention.

What is claimed is:

1. In a device of the character described, a rotatable shaft, a plurality of rotatable elements on said shaft, means connected to said shaft for directly rotating one of said elements, means for consecutively rotating the remainder of said elements after a predetermined number of revolutions of said one element, a shield carried by one of said elements and extending over a portion of the remainder of said elements, said shield being rotatable with said one element, a second plurality of rotatable elements, means connected to said shaft for rotating said elements respectively in synchronism with said first plurality, and a shield carried by one of said second plurality of elements, said second shield having an opening formed therein whereby upon rotation thereof said opening is synchronously rotated in alignment with said first shield.

2. In an altimeter of the type having means for setting it for a predetermined altitude, the combination of two groups of interconnected numeral wheels connected to and operable by said setting means and arranged in juxtaposition, each wheel having a set of numerals and being movable in either direction to select for exhibition a single numeral from each set, said selected numerals constituting a figure representing in units of distance the predetermined altitude for which the altimeter is set, and means operable with said numeral wheels for obscuring the numerals of one group while the numerals of the other group are presented to view and vice versa, said last-named means including means for supplementing the indication of each group of numeral wheels by a distinguishing sign to indicate whether the preset altitude is above or below sea level.

3. In an altimeter of the type having means for setting it for a predetermined altitude, the combination of two groups of interconnected numeral wheels connected to and operable by said setting means and arranged in juxtaposition, each wheel having a set of numerals and being movable in either direction to select for exhibition a single numeral from each set, said selected numerals constituting a figure representing in units of distance the predetermined altitude for which the altimeter is set, and means operable with said numeral wheels for obscuring the numerals of one group while the numerals of the other group are presented to view and vice versa, said last-named means including means for supplementing the indication of one group of numeral wheels by a plus sign to indicate that the preset altitude is above sea level, and means for supplementing the indication of the other group of numeral wheels by a minus sign to indicate that the preset altitude is below sea level.

4. In combination, means providing a window, an actuating shaft, indicating means adapted to be viewed through said window to indicate in numerals the value of a desired factor, said indicating means comprising two groups of interconnected numeral wheels connected to and operable by said actuating shaft and arranged in juxtaposition, each wheel having a set of numerals and being movable in either direction to select for exhibition in said window a single numeral from each set, the numerals on the wheels of one group progressively increasing in an opposite direction to the numerals of the other group for the same direction of rotation of said wheels, said selected numerals constituting a figure representing the value of a desired factor, and means operable with said numeral wheels for obscuring the numerals of one group while the numerals of the other group are presented to view and vice versa, said last-named means including means for supplementing the indication of each group of numeral wheels by a distinguishing sign to indicate whether the indication shown is above or below a certain datum.

5. In combination, means providing a window, an actuating shaft, indicating means adapted to be viewed through said window to indicate in numerals the value of a desired factor, said indicating means comprising two groups of interconnected numeral wheels connected to and operable by said actuating shaft and arranged in juxtaposition, each wheel having a set of numerals and being movable in either direction to select for exhibition in said window a single numeral from each set, the numerals on the wheels of one group progressively increasing in an opposite direction to the numerals of the other group for the same direction of rotation of said wheels, said selected numerals constituting a figure representing the value of a desired factor, and means operable with said numeral wheels for obscuring the numerals of one group while the numerals of the other group are presented to view and vice versa, said last-named means including means for supplementing the indication of one group of numeral wheels by a plus sign, and means supplementing the indication of the other group of numeral wheels by a minus sign.

KURT R. H. SCHWENN.